US012769954B2

(12) United States Patent
Chung et al.

(10) Patent No.: US 12,769,954 B2
(45) Date of Patent: Oct. 20, 2026

(54) ELECTRONIC DEVICE, METHOD, AND NON-TRANSITORY COMPUTER-READABLE MEDIUM FOR IMPROVING INFERENCE PERFORMANCE OF A PRE-TRAINED LANGUAGE MODEL BY OUTPUTTING MIDDLE-LAYER PREDICTION RESULT BASED ON CONFIDENCE LEVEL

(71) Applicant: AJOU UNIVERSITY INDUSTRY-ACADEMIC COOPERATION FOUNDATION, Suwon-Si (KR)

(72) Inventors: Tae-Sun Chung, Seongnam-si (KR); Zhen Zhang, Suwon-Si (KR)

(73) Assignee: AJOU UNIVERSITY INDUSTRY-ACADEMIC COOPERATION FOUNDATION, Suwon-Si (KR)

( * ) Notice: Subject to any disclaimer, the term of this patent is extended or adjusted under 35 U.S.C. 154(b) by 272 days.

(21) Appl. No.: 18/476,598

(22) Filed: Sep. 28, 2023

(65) Prior Publication Data

US 2024/0111965 A1 Apr. 4, 2024

(30) Foreign Application Priority Data

Sep. 28, 2022 (KR) ........................ 10-2022-0123189

(51) Int. Cl.
*G06N 3/08* (2023.01)
*G06F 40/40* (2020.01)

(52) U.S. Cl.
CPC .................................... *G06F 40/40* (2020.01)

(58) Field of Classification Search
CPC ........... G06N 3/08; G06N 20/00; G06F 40/00
See application file for complete search history.

(56) References Cited

U.S. PATENT DOCUMENTS

2022/0358358 A1* 11/2022 Raje ........................ G06N 3/045
2022/0398451 A1* 12/2022 Surya ...................... G06F 18/25

OTHER PUBLICATIONS

Zhu, Wei. "LeeBERT: Learned early exit for BERT with cross-level optimization." Proceedings of the 59th Annual Meeting of the Association for Computational Linguistics and the 11th International Joint Conference on Natural Language Processing (vol. 1: Long Papers). 2021. (Year: 2021).*

(Continued)

*Primary Examiner* — Jialong He
(74) *Attorney, Agent, or Firm* — Osha Bergman Watanabe & Burton LLP

(57) ABSTRACT

The electronic device for improving the inference performance of a pre-trained language model according to an exemplary embodiment of the present invention includes a processor for sequentially passing input data through a plurality of transformer layers of the pre-trained language model and obtaining output data, wherein the processor calculates a probability distribution for prediction results received from each transformer layer in each of a plurality of middle layers connected to each rear end of the plurality of transformer layers, and measures a confidence level of the prediction results based on an entropy value calculated by using the probability distribution, and wherein when a confidence level less than a predefined value is measured in a predefined number of consecutive middle layers among the plurality of middle layers, the processor outputs a prediction result of the first middle layer as the output data by taking the last first middle layer among the consecutive middle layers as an exit.

9 Claims, 4 Drawing Sheets

(56) References Cited

OTHER PUBLICATIONS

Xin, Ji, et al. "BERxiT: Early exiting for BERT with better fine-tuning and extension to regression." Proceedings of the 16th conference of the European chapter of the association for computational linguistics: Main Volume. 2021. (Year: 2021).*
Teerapittayanon, Surat, Bradley McDanel, and Hsiang-Tsung Kung. "Branchynet: Fast inference via early exiting from deep neural networks." 2016 23rd international conference on pattern recognition (ICPR). IEEE, 2016. (Year: 2016).*
Li, Xiaonan, et al. "Accelerating bert inference for sequence labeling via early-exit." arXiv preprint arXiv:2105.13878 (2021). (Year: 2021).*
Zhen Zhang et al. "PCEE-BERT: Accelerating BERT Inference via Patient and Confident Early Exiting", Findings of the Association for Computational Linguistics: NAACL 2022, pp. 327-338, Jul. 10-15, 2022 (12 pages).
Office Action issued in counterpart Korean Patent Application No. 10-2022-0123189 mailed Nov. 4, 2024 (11 pages).
Zhou, et al. "BERT Loses Patience: Fast and Robust Inference with Early Exit." 34th Conference on Neural Information Processing Systems (NeurIPS 2020), Vancouver, Canada. arXiv preprint arXiv:2006.04152v3 [cs.CL], Oct. 22, 2020. (14 pages).

* cited by examiner

ELECTRONIC DEVICE, METHOD, AND NON-TRANSITORY COMPUTER-READABLE MEDIUM FOR IMPROVING INFERENCE PERFORMANCE OF A PRE-TRAINED LANGUAGE MODEL BY OUTPUTTING MIDDLE-LAYER PREDICTION RESULT BASED ON CONFIDENCE LEVEL

CROSS-REFERENCE TO RELATED APPLICATION

This application claims priority to and the benefit of Korean Patent Application No. 10-2022-0123189, filed on Sep. 28, 2022, the disclosure of which is incorporated herein by reference in its entirety.

TECHNICAL FIELD

The present invention relates to an electronic device for improving the inference performance of a pre-trained language model, a method thereof and a recording medium.

BACKGROUND ART

Since the release of the bidirectional encoder representations from transformers (BERT), many pre-training language models (PLM), such as GPT, XLNet, ALBERT and the like, have become SOTA (state of the art) models for natural language processing (NLP).

These BERT-style models have achieved significant improvements in many natural language processing tasks by pre-training on unlabeled text corpus and fine-tuning the same on labeled tasks such as text classification, natural language inference (NLI) and sequence labeling.

However, in spite of the excellent performance, current PLMs have a problem of overthinking, and the layers in the sentence classification task may be too deep for some samples.

This can lead to another problem of high latency, and high latency can cause user inconvenience when there are many consumer queries, for example, flu season in the PLM implementing online medical consultation.

It is important to dynamically adjust the latency to prevent overthinking of the language model and an increase in latency. To this end, adaptive inference, which can dynamically adjust latency, has emerged. Early exiting, which is one of the most important adaptive inference methods, is a method in which a middle layer (classifier) is installed at the rear end of each transformer layer of the language model and the inference is terminated early when the inference result satisfies certain conditions.

However, the existing early exiting method is inflexible in adjusting the speed improvement ratio. That is, if the parameters for early exiting are fixed, only a fixed speed improvement ratio can be achieved, which is inconvenient to be used in actual industrial scenarios.

Therefore, the situation is that research on a new and efficient inference method that is capable of flexibly adjusting the speed improvement ratio and compensating for the trade-off between performance and speed is required.

DISCLOSURE

Technical Problem

An object of the present invention is to provide an electronic device which is capable of adaptively adjusting the inference speed of a pre-trained language model, a method thereof and a recording medium.

Another object of the present invention is to provide an electronic device that outputs an accurate prediction result while improving the inference speed of a pre-trained language model, a method thereof and a recording medium.

Technical Solution

The electronic device for improving the inference performance of a pre-trained language model according to an exemplary embodiment of the present invention includes a processor for sequentially passing input data through a plurality of transformer layers of the pre-trained language model and obtaining output data, wherein the processor may calculate a probability distribution for prediction results received from each transformer layer in each of a plurality of middle layers, wherein the each of the plurality of middle layers is connected to each rear end of the plurality of transformer layers, measure a confidence level of the prediction results based on an entropy value calculated by using the probability distribution, and when a confidence level less than a predefined value is measured in a predefined number of consecutive middle layers among the plurality of middle layers, output a prediction result of first middle layer which is last middle layer among the consecutive middle layers as the output data by taking the first middle layer as an exit.

The processor may count the number of consecutive middle layers in which the confidence level measured in each of the plurality of middle layers is less than a predefined value.

The processor may identify a prediction result for the input data each time of passing through each layer of the plurality of transformer layers.

The processor may adjust at least one of a predefined number of consecutive middle layers and a predefined value of the confidence level.

When a confidence level that is greater than or equal to a predefined value is measured in the second middle layer, the processor may correct the prediction result in a transformer layer next to a transformer layer corresponding to a second middle layer.

The method for improving the inference performance of a pre-trained language model performed by an electronic device may include the step of obtaining output data by sequentially passing input data through a plurality of transformer layers of the pre-trained language model, wherein the step of obtaining output data includes the steps of calculating a probability distribution for prediction results received from each transformer layer in each of a plurality of middle layers, wherein the each of the plurality of middle layers is connected to each rear end of the plurality of transformer layers; measuring a confidence level of the predicted results based on an entropy value calculated by using the probability distribution; and outputting a prediction result of first middle layer which is last middle layer among the consecutive middle layers as the output data by taking the first middle layer as an exit, when a confidence level that is less than a predefined value is measured in a predefined number of consecutive middle layers among the plurality of middle layers.

The step of obtaining output data may include the step of counting the number of consecutive middle layers in which the confidence level measured in each of the plurality of middle layers is less than a predefined value.

The step of calculating a probability distribution may include the step of identifying a prediction result for the input data each time of passing through each layer of the plurality of transformer layers.

The method may further include the step of adjusting at least one of a predefined number of consecutive middle layers and a predefined value of the confidence level.

The step of measuring a confidence level may include the step of correcting the prediction result in a transformer layer next to a transformer layer corresponding to a second middle layer, when a confidence level that is greater than or equal to a predefined value is measured in the second middle layer.

The recording medium in which a computer-readable program is recorded is a recording medium in which a computer program, which includes a code for performing a method for improving the inference performance of a pre-trained language model is stored as a computer-readable code, wherein the method includes the step of obtaining output data by sequentially passing input data through a plurality of transformer layers of the pre-trained language model, wherein the step of obtaining output data includes the steps of calculating a probability distribution for prediction results received from each transformer layer in each of a plurality of middle layers, wherein the each of the plurality of middle layers is connected to each rear end of the plurality of transformer layers; measuring a confidence level of the predicted results based on an entropy value calculated by using the probability distribution; and when a confidence level less than a predefined value is measured in a predefined number of consecutive middle layers among the plurality of middle layers, outputting a prediction result of first middle layer which is last middle layer among the consecutive middle layers as the output data by taking the first middle layer as an exit.

Advantageous Effects

According to an exemplary embodiment of the present invention, early exiting occurs when consecutive middle layers are confident about the predicted outcome, thereby making the early exiting decision more reliable.

According to an exemplary embodiment of the present invention, since at least one of a predefined number of consecutive middle layers and a predefined value of a confidence level can be conveniently adjusted, the speed improvement ratio can be controlled, which is more flexible.

According to an exemplary embodiment of the present invention, it can be applied to various backbone models and can increase inference speed by operating together with a model compression method.

MODES OF THE INVENTION

Figure 1:
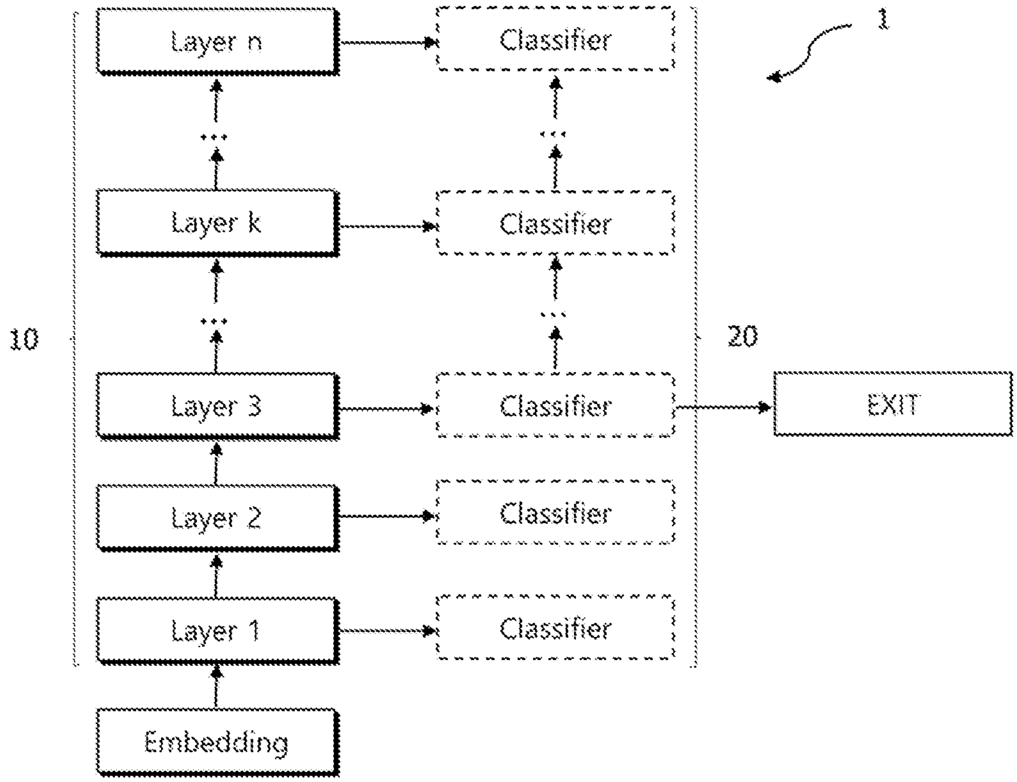
FIG. 1 is a schematic diagram illustrating a pre-trained language model according to an exemplary embodiment of the present invention.

Hereinafter, preferred exemplary embodiments according to the present invention will be described in detail with reference to the accompanying drawings. The detailed description set forth below in conjunction with the accompanying drawings is intended to describe the exemplary embodiments of the present invention and is not intended to represent the only exemplary embodiments in which the present invention may be practiced. In order to clearly describe the present invention in the drawings, parts that are irrelevant to the description may be omitted, and the same reference numerals may be used for the same or similar components throughout the specification.

FIG. 1 is a schematic diagram illustrating a pre-trained language model according to an exemplary embodiment of the present invention.

FIG. 1 illustrates the basic structure of a pre-trained language model 1 (hereinafter, also referred to as a language model 1) according to an exemplary embodiment of the present invention. The language model 1 according to an exemplary embodiment of the present invention has a structure in which a plurality of transformer layers 10 and a plurality of middle layers 20 at each rear end of the plurality of transformer layers 10 are connected. In this case, the middle layer 20 is an exit through which inference may be terminated early, and as shown in FIG. 1, the language model 1 may terminate inference early at a third exit according to a prediction result.

The language model 1 according to an exemplary embodiment of the present invention may adopt the BERT as a backbone model. The BERT is a network with multi-layer transformers and is pre-trained in a self-supervised manner in a large-scale corpus. However, the present invention is not limited thereto, and it may be applied to other types of pre-trained backbone models such as ALBERT and Tiny-BERT6.

As described above, in order to prevent excessive thinking of the language model and an increase in latency, the language model 1 adopts an early exiting scheme that dynamically adjusts an inference speed.

In this case, the method of early exiting includes a budget exiting mode and a dynamic early exiting mode. The budget exiting mode makes predictions with a fixed exit for every query, and specifies a shallower exit for handling many queries. The dynamic early exiting mode is designed to determine whether to terminate at each layer for the prediction results obtained at the previous and current layers. The dynamic early exiting mode allows different samples to terminate at different depths.

The language model 1 according to an exemplary embodiment of the present invention adopts the Patient and Confident Early Exiting-BERT (PCEE-BERT), which is a patience and confidence-based early exiting.

According to an exemplary embodiment of the present invention, when input data is embedded in the language model 1, it sequentially passes through a plurality of transformer layers 10 of the language model 1 to obtain output data.

The language model 1 terminates early if the number of consecutive middle layers to be sure about the prediction result is sufficient. In this case, the language model 1 uses entropy that is calculated by using a probability distribution as a confidence level. The language model 1 may perform predictions in the next layer without early exiting just because some middle layers are confident.

In this way, the language model 1 may finish with higher accuracy while maintaining flexibility, and the performance is superior, especially when the speed-up ratio is large.

Since the language model 1 is installed and driven in an electronic device, the configuration and operation of the electronic device according to an exemplary embodiment of the present invention will be described in detail with reference to the drawings below.

Figure 2:
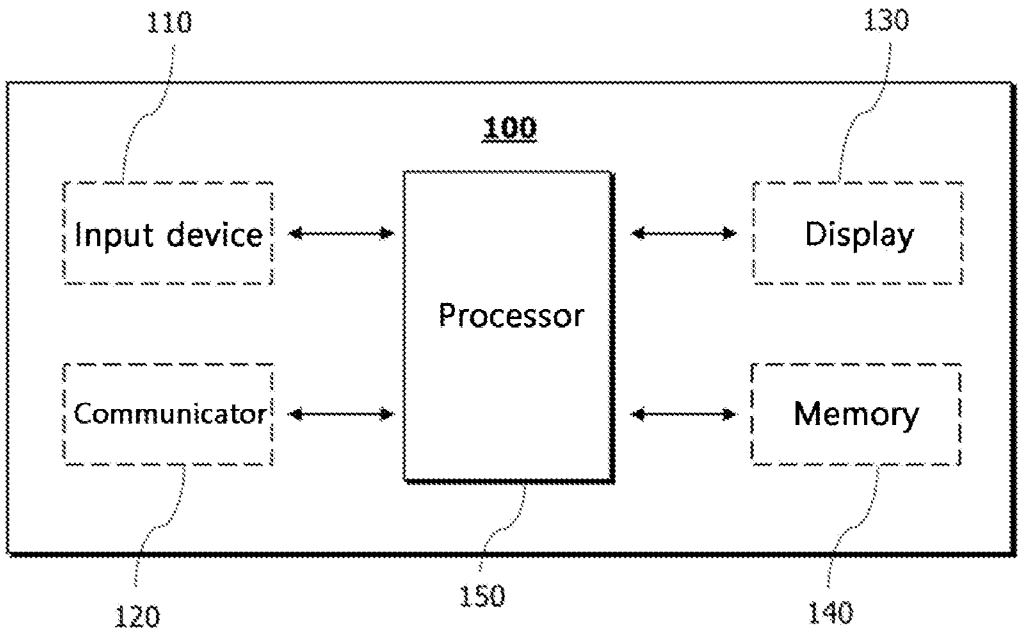
FIG. 2 is a block diagram illustrating the configuration of an electronic device according to an exemplary embodiment of the present invention.

FIG. 2 is a block diagram illustrating the configuration of an electronic device according to an exemplary embodiment of the present invention.

The electronic device 100 according to an exemplary embodiment of the present invention is a device for improving the inference performance of the pre-trained language model 1, and it may be implemented as a computer, server or the like.

The electronic device 100 according to an exemplary embodiment of the present invention includes an input device 110, a communicator 120, a display 130, a memory 140 and a processor 150.

The input device 110 generates input data in response to a user input of the electronic device 100. For example, the user input may be a user input for starting an operation of the electronic device 100 and an input for embedding input data, and other than the above, in the case of user input that is necessary to use the language model 1 with improved inference performance and obtain output data, it may be applied without limitation.

The input device 110 includes at least one input means. The input device 110 may include a keyboard, a key pad, a dome switch, a touch panel, a touch key, a mouse, a menu button and the like.

The communicator 120 communicates with an external device such as a server and the like to transmit and receive input data, a pre-trained language model, output data and the like. To this end, the communicator 120 may perform wireless communication such as 5th generation communication (5G), long term evolution-advanced (LTE-A), long term evolution (LTE), wireless fidelity (Wi-Fi) and the like, or wired communication such as a local area network (LAN), wide area network (WAN), power line communication and the like.

The display 130 displays display data according to the operation of the electronic device 100. The display 130 may display a screen for receiving user input and a screen for displaying output data.

The display 130 may include a liquid crystal display (LCD), a light emitting diode (LED) display, an organic LED (OLED) display, and a micro-electro mechanical systems (MEMS) display and an electronic paper display. The display 130 may be combined with the input device 110 and implemented as a touch screen.

The memory 140 stores operating programs of the electronic device 100. The memory 140 includes a non-volatile storage that can retain data (information) regardless of whether electric power is provided, and a volatile memory that can load data to be processed by the processor 150 and cannot retain data unless electric power is supplied. Examples of storage include flash-memory, hard-disc drive (HDD), solid-state drive (SSD), read-only memory (ROM), and examples of memory include buffer, random access memory (RAM) and the like.

The memory 140 may store the language model 1. The memory 140 may store calculation programs that are necessary for performing probability distribution calculation, entropy value calculation, counting the number of middle layers and the like.

The processor 150 may execute software such as a program and the like to control at least one other component (e.g., a hardware or software component) of the electronic device 100 and perform various data processing or calculations.

The processor 150 according to an exemplary embodiment of the present invention may obtain output data by sequentially passing input data through a plurality of transformer layers of a pre-trained language model. The processor 150 according to an exemplary embodiment of the present invention calculates a probability distribution for the prediction results received from each transformer layer in each of a plurality of middle layers connected to each rear end of a plurality of transformer layers, and measures the confidence level of the prediction results based on the calculated entropy value by using the probability distribution, and when a confidence level less than a predefined value is measured in a predefined number of consecutive middle layers among the plurality of middle layers, outputting a prediction result of first middle layer which is last middle layer among the consecutive middle layers as the output data by taking the first middle layer as an exit.

In this case, the processor 150 may learn the language model 1 or may receive and store a language model 1 that is pre-learned and generated from the outside and use the language model 1, but the present invention is not limited thereto.

Meanwhile, the processor 150 may perform at least some of the data analysis, processing and result information generation for performing the above operations by using at least one of machine learning, neural network or deep learning algorithm as a rule-based or artificial intelligence algorithm. Examples of the neural network may include models such as a convolutional neural network (CNN), a deep neural network (DNN) and a recurrent neural network (RNN).

Figure 3:
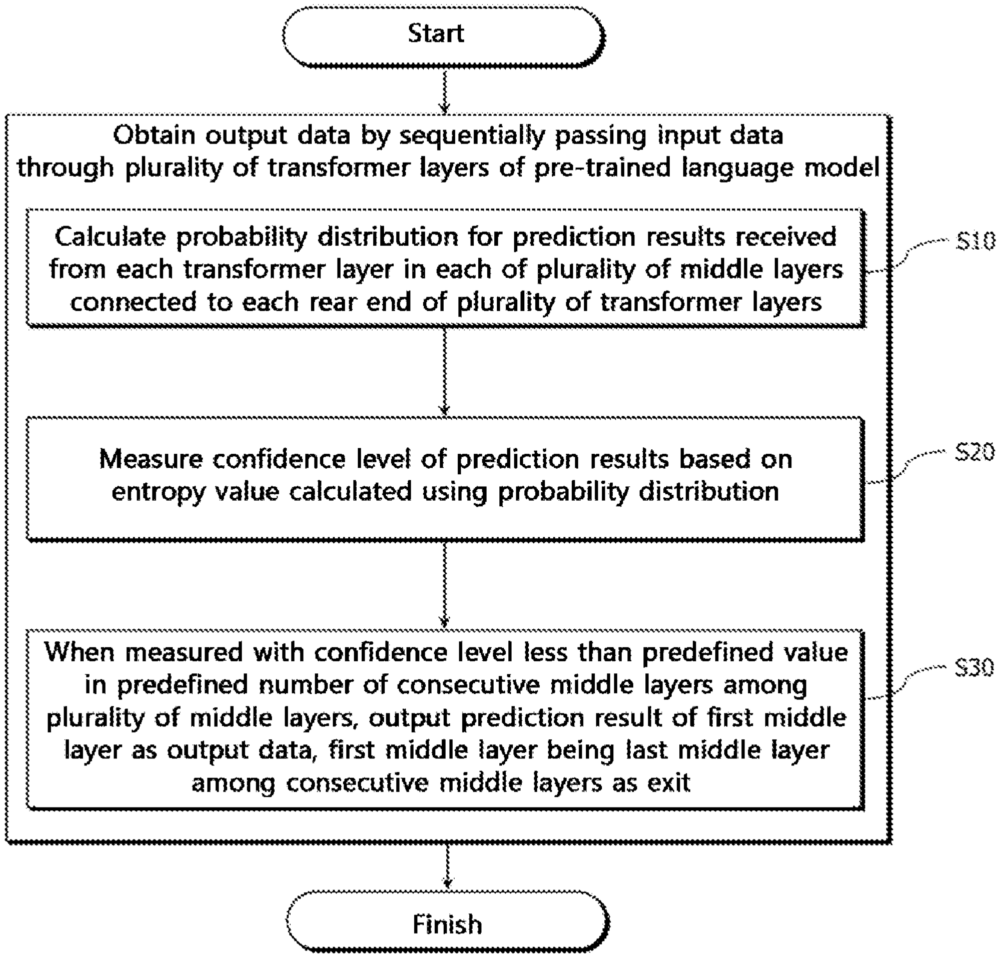
FIG. 3 is a diagram illustrating the operation flowchart of an electronic device according to an exemplary embodiment of the present invention.

FIG. 3 is a diagram illustrating the operation flowchart of an electronic device according to an exemplary embodiment of the present invention.

According to an exemplary embodiment of the present invention, the processor 150 calculates a probability distribution for the prediction results received from each transformer layer in each of a plurality of middle layers connected to each rear end of a plurality of transformer layers (S10).

As illustrated in FIG. 1, the language model 1 has a network structure with an exit at each transformer layer.

The processor 150 may identify a prediction result of the input data each time of passing through each layer of the plurality of transformer layers. The identified prediction result is delivered to the middle layer connected to the rear end of the corresponding transformer layer.

It is assumed that the feed forward process for predicting the input data x has gone through layers 1, . . . , m−1, and is now at layer m. After the input data passes through the transformer layer m, the processor 150 calculates a probability distribution $p^{(m)}(x; \theta^{(m)})$ for the prediction result of the transformer layer m in the middle layer $f^{(m)}(x; \theta^{(m)})$ connected to the rear end of the transformer layer m. In this case, all parameters of the transformer layer and the middle layer are denoted by θ.

In the training phase, all exits are jointly optimized with a summed loss function. The loss function is the weighted average of the cross entropy (CE) losses as shown in Mathematical Formula 1.

$$\mathcal{L} = \frac{\sum_{m=1}^{M} m * \mathcal{L}^{(m)}}{\sum_{m=1}^{M} m}$$ [Mathematical Formula 1]

Herein, $L^{(m)}=CE(y, p^{(m)}(x;\ \theta^{(m)}))$ represents the cross entropy loss at the $m^{th}$ exit. The weight m corresponds to the relative inference cost of the exit m.

According to an exemplary embodiment of the present invention, the processor 150 measures the confidence level of the prediction results based on the entropy value calculated by using the probability distribution (S20).

The confidence level ($C^{(m)}$) of the transformer layer m is measured as the entropy value of the probability distribution $p^{(m)}(x;\ \theta^{(m)})$ as shown in Mathematical Formula 2.

$$C^{(m)} = \frac{\sum_{k=1}^{K} p_k^{(m)} \log p_k^{(m)}}{\log\left(\frac{1}{K}\right)} \quad \text{[Mathematical Formula 2]}$$

Herein, $$p_k^{(m)}$$

is the probability mass for the $k^{th}$ class label. If the confidence level ($C^{(m)}$) is less than a predefined value $\tau$, it is considered that the prediction of the transformer layer m is reliable. If the confidence level ($C^{(m)}$) is greater than the predefined value $\tau$, it is considered that the prediction of the transformer layer m is unreliable.

According to an exemplary embodiment of the present invention, when the confidence level that is less than a predefined value is measured in a predefined number of consecutive middle layers among a plurality of middle layers, the processor 150 outputs the prediction result of middle layer (hereinafter, it is called "first middle layer") which is last middle layer among the consecutive middle layers as the output data by taking the first middle layer as an exit (S30).

The processor 150 may count the number of consecutive middle layers in which the confidence level measured in each of the plurality of middle layers is less than a predefined value. In this case, the processor 150 uses a patience counter (pct) to store the number of times the prediction maintains confidence in the consecutive middle layers. In this regard, specific details will be described with reference to FIG. 4.

When the number of patience counts ($pct^{(m)}$) in the transformer layer m reaches a predefined number (integer) t, the processor 150 terminates inference early in the transformer layer m.

That is, the processor 150 terminates inference early if the number of consecutive middle layers that can be sure about the probability distribution of the prediction result is sufficient.

If this condition is not satisfied, the processor 150 uses the final classifier M for prediction. In this way, the language model may terminate early without going through all the layers for prediction.

According to an exemplary embodiment of the present invention, the processor 150 may adjust at least one of a predefined number of consecutive middle layers and a predefined value of the confidence level such that the inference of the language model may reach different speed improvement ratios.

In addition, since there is a prediction module in each transformer layer of the language model according to an exemplary embodiment of the present invention, model ensemble may be performed across layers through which the forward pass has already passed. A cross-layer ensemble results in performance degradation when a large speed improvement ratio is applied, whereas performance improves when a low speed improvement ratio is applied. That is, it is possible to determine whether to adopt a cross-layer ensemble according to the depth of the layer. In the present invention, since the inference speed improvement ratio can be adjusted, it is possible to determine whether to adopt a cross-layer ensemble depending on circumstances.

According to an exemplary embodiment of the present invention, since early exiting occurs when consecutive middle layers are confident about the predicted outcome, it makes the early exiting decision more reliable.

According to an exemplary embodiment of the present invention, since at least one of a predefined number of consecutive middle layers and a predefined value of a confidence level can be conveniently adjusted, the speed improvement ratio may be controlled, which is more flexible.

Figure 4:
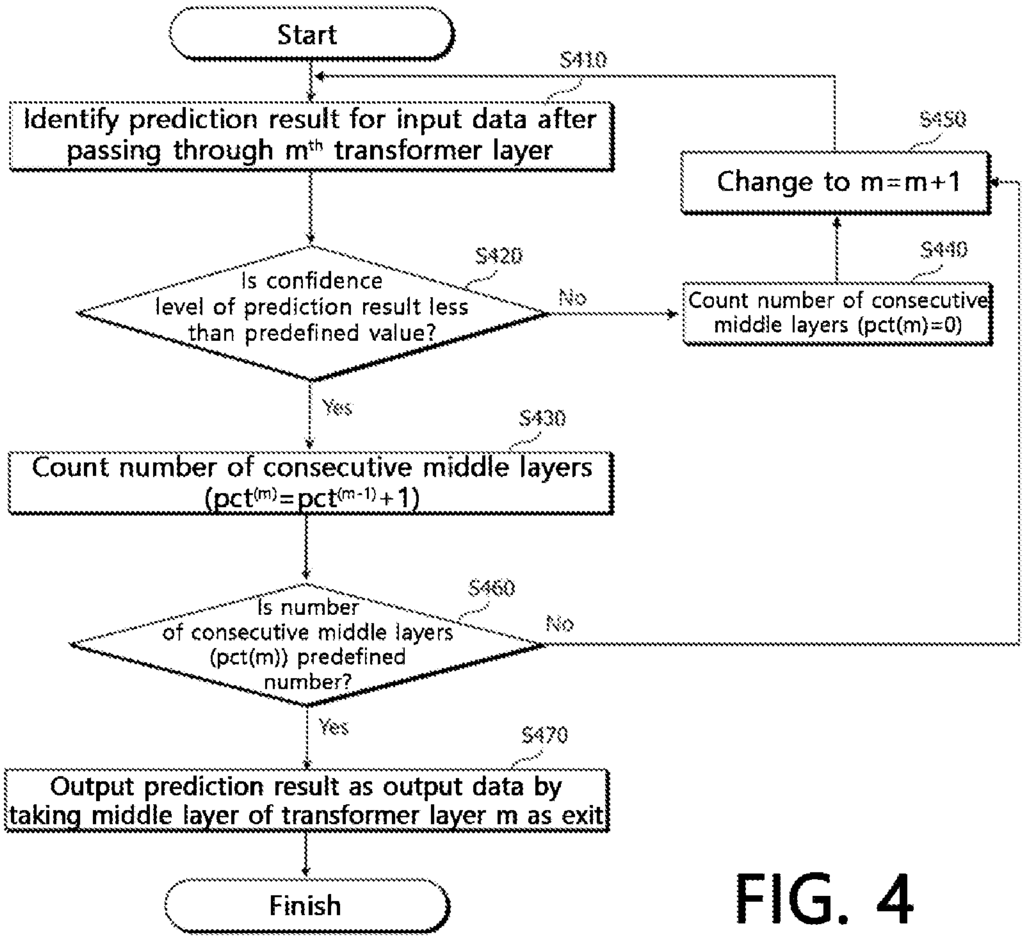
FIG. 4 is a diagram illustrating the operation flowchart of an electronic device according to an exemplary embodiment of the present invention.

FIG. 4 is a diagram illustrating the operation flowchart of an electronic device according to an exemplary embodiment of the present invention.

In FIG. 4, as described in S30 of FIG. 3, the process of determining early exiting will be described in detail. In this case, the detailed description of the contents overlapping with the contents described in FIG. 3 will be omitted.

First of all, the processor 150 identifies a prediction result for input data after passing through the transformer layer m (S410). In this case, it is assumed that early exiting has not been determined until the $m-1^{th}$ time.

The processor 150 identifies whether the confidence level of the prediction result is less than a predefined value (S420). If the confidence level is less than the predefined value (Yes in S420), the processor 150 adds one from the number of patience counts counted in the transformer layer m−1 (S430).

If the confidence level is greater than or equal to the predefined value (No in S420), the processor 150 may count the number of consecutive middle layers as 0 (S440).

That is, mathematically, the number of patience counts ($pct^{(m)}$) in the transformer layer m may be calculated as shown in Mathematical Formula 3 below.

$$pct^{(m)} = \begin{cases} pct^{(m-1)} + 1, & \text{if } C^{(m)} < \tau, \\ 0, & \text{otherwise} \end{cases} \quad \text{[Mathematical Formula 3]}$$

When the number of consecutive middle layers is counted as 0 because the confidence level is less than a predefined value (S440), the processor 150 moves from the transformer layer m to the transformer layer m+1 and performs S410 again (S450).

When the number of consecutive middle layers is added (S430), the processor 150 identifies whether the number of consecutive middle layers ($pct^{(m)}$) is a predefined number (S460). If it is less than the predefined number (No in S460), the processor 150 moves to the transformer layer m+1 through S450 and performs S410.

When the number of consecutive middle layers ($pct^{(m)}$) reaches a predefined number (Yes in S460), the processor 150 outputs the prediction result as output data by taking the middle layer of the transformer layer m as an exit. (S470).

In this case, the middle layer of the transformer layer m means a middle layer that is connected to the rear end of the transformer layer m.

According to an exemplary embodiment of the present invention, the language model 1 is flexible because it can easily control the average inference layer and achieve all speed improvement ratios by adjusting the confidence level and the number of consecutive middle layers that satisfy the confidence level.

Therefore, the PCEE-BERT may adopt various confidence measures, such as maximum probability mass, and the present invention with improved inference performance may consistently perform well in various backbone models and operate with the model compression method to increase inference speed. Additionally, the PCEE-BERT has the advantage of performing well in computer vision tasks as well.

What is claimed is:

1. An electronic device comprising:

a memory storing a pre-trained language model and one or more instructions; and a processor configured to execute the one or more instructions stored in the memory, wherein the processor is configured to:

sequentially pass input data through a plurality of transformer layers of the pre-trained language model and obtain output data, monitor an inference state of the pre-trained language model by calculating a probability distribution for prediction results received from each transformer layer in each of a plurality of middle layers, wherein each of the plurality of middle layers is connected to each rear end of the plurality of transformer layers, measure a confidence level of the prediction results based on an entropy value calculated by using the probability distribution, manage a patience counter to accumulate a number of consecutive middle layers among the plurality of middle layers and in which the confidence level measured in each of the plurality of middle layers is less than a predefined value, in response to the patience counter reaching a predefined number, dynamically control an inference path of the pre-trained language model by outputting a prediction result of first middle layer which is last middle layer among the consecutive middle layers as the output data by taking the first middle layer as an exit, and optimize a trade-off between inference speed and accuracy of the electronic device by variably adjusting at least one of the predefined number of the consecutive middle layers and the predefined value of the confidence level.

2. The electronic device of claim 1, wherein the processor is configured to identify a prediction result for the input data each time of passing through each layer of the plurality of transformer layers.

3. The electronic device of claim 1, wherein when a confidence level that is greater than or equal to the predefined value is measured in second middle layer, the processor is configured to correct the prediction result in a transformer layer next to a transformer layer corresponding to the second middle layer.

4. A method performed by an electronic device comprising a memory storing a pre-trained language model and one or more instructions and a processor configured to execute the one or more instructions stored in the memory, the method performed by the processor comprising:

sequentially passing input data through a plurality of transformer layers of the pre-trained language model and obtaining output data, wherein the obtaining of the output data comprises:

monitoring an inference state of the pre-trained language model by calculating a probability distribution for prediction results received from each transformer layer in each of a plurality of middle layers, wherein each of the plurality of middle layers is connected to each rear end of the plurality of transformer layers;

measuring a confidence level of the prediction results based on an entropy value calculated by using the probability distribution;

managing a patience counter to accumulate a number of consecutive middle layers among the plurality of middle layers and in which the confidence level measured in each of the plurality of middle layers is less than a predefined value; and in response to the patience counter reaching a predefined number, dynamically control an inference path of the pre-trained language model by outputting a prediction result of first middle layer which is last middle layer among the consecutive middle layers as the output data by taking the first middle layer as an exit, and the method further comprises:

optimizing a trade-off between inference speed and accuracy of the electronic device by variably adjusting at least one of the predefined number of the consecutive middle layers and the predefined value of the confidence level.

5. The method of claim 4, wherein calculating of the probability distribution comprises:

identifying a prediction result for the input data each time of passing through each layer of the plurality of transformer layers.

6. The method of claim 4, wherein measuring of the confidence level comprises:

when a confidence level that is greater than or equal to a predefined value is measured in second middle layer, correcting the prediction result in a transformer layer next to a transformer layer corresponding to the second middle layer.

7. A non-transitory computer readable medium storing instructions comprising a code for causing a processor to execute:

sequentially passing input data through a plurality of transformer layers of the pre-trained language model and obtaining output data, wherein obtaining of the output data comprises:

monitoring an inference state of the pre-trained language model by calculating a probability distribution for prediction results received from each transformer layer in each of a plurality of middle layers, wherein each of the plurality of middle layers is connected to each rear end of the plurality of transformer layers and obtaining output data;

measuring a confidence level of the prediction results based on an entropy value calculated by using the probability distribution;

managing a patience counter to accumulate a number of consecutive middle layers among the plurality of middle layers and in which the confidence level measured in each of the plurality of middle layers is less than a predefined value; and in response to the patience counter reaching a predefined number, dynamically controlling an inference path of the pre-trained language model by outputting a prediction result of first middle layer which is last middle layer among the consecutive middle layers as the output data by taking the first middle layer as an exit, and the method further comprises:

optimizing a trade-off between inference speed and accuracy of the processor by variably adjusting at least one of the predefined number of the consecutive middle layers and the predefined value of the confidence level.

8. The non-transitory computer readable medium of claim 7, wherein calculating of the probability distribution comprises:

identifying a prediction result for the input data each time of passing through each layer of the plurality of transformer layers.

9. The non-transitory computer readable medium of claim 7, wherein measuring of the confidence level comprises:

when a confidence level that is greater than or equal to a predefined value is measured in second middle layer, correcting the prediction result in a transformer layer next to a transformer layer corresponding to the second middle layer.

* * * * *